Patented Oct. 19, 1943

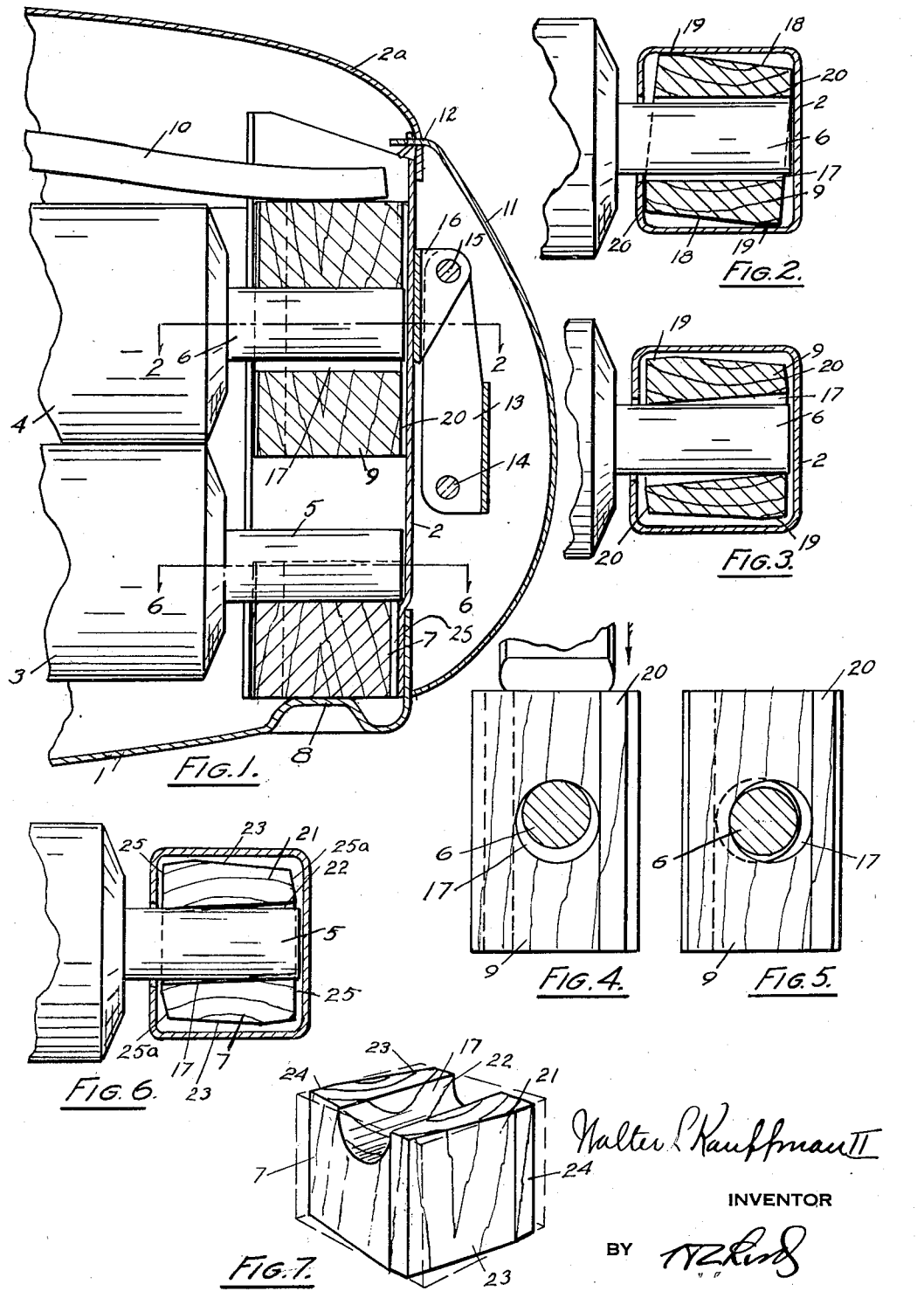

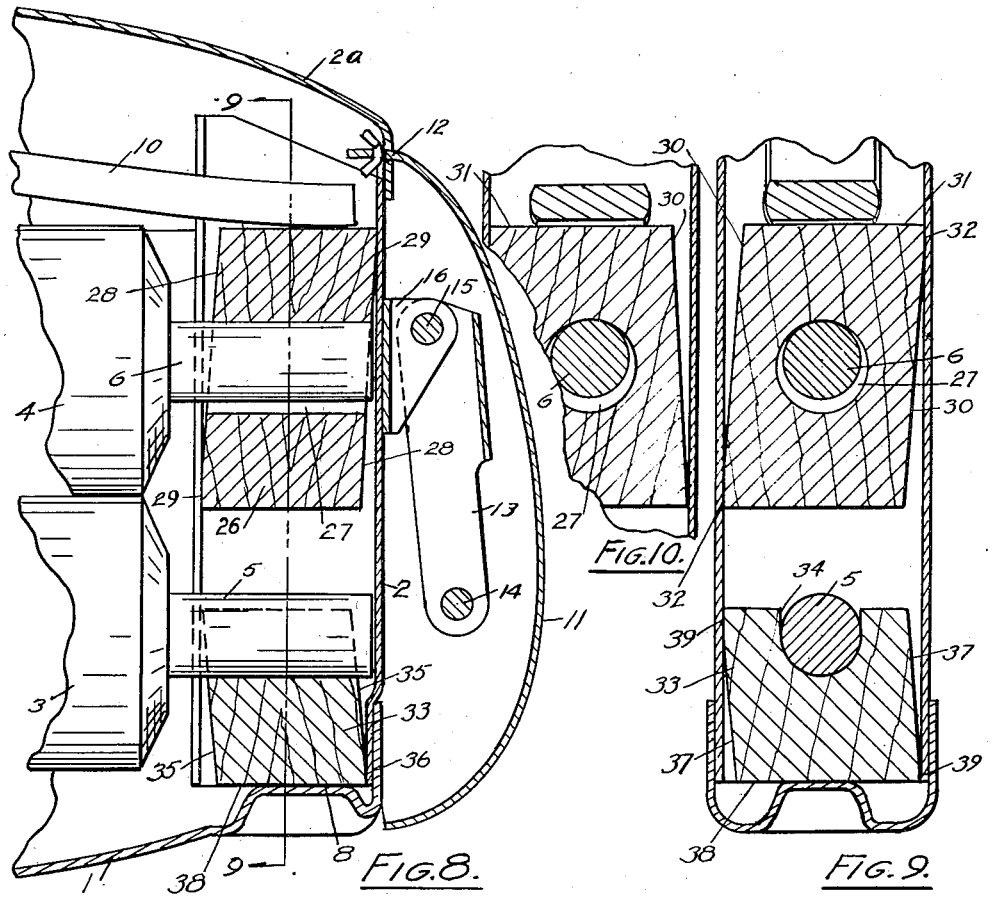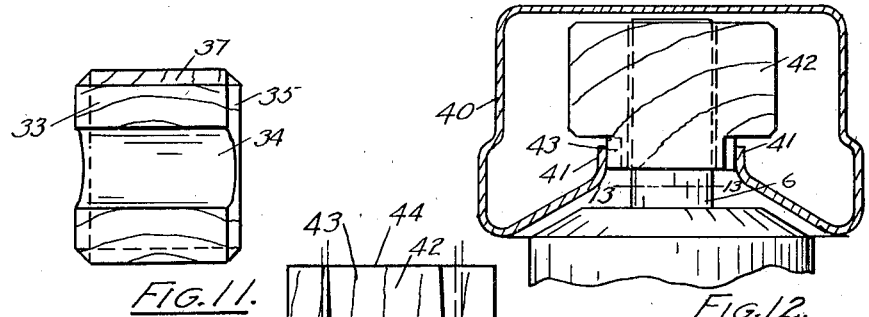

2,332,232

UNITED STATES PATENT OFFICE 2,332,232

WRINGER

Walter L. Kauffman, II, Erie, Pa., assignor to Lovell Manufacturing Company, Erie, Pa., a corporation of Pennsylvania Application January 30, 1941, Serial No. 376,639

4 Claims. (Cl. 68—269)

Many wringers are supplied with bearings of block form which are movably mounted in the stiles of the wringer. Many of such bearings are formed of wood. It is desirable to have the bearing blocks in close guiding engagement with the walls of the stile when the wringer is working or under pressure. On the other hand it is desirable to have the block entirely loose and free when the pressure is removed. It is also desirable to have a movable block at least free to move under all conditions and particularly free to move when pressure is released for safety purposes as any blocking of the release defeats the safety action. The present invention is designed to adjust the block into close guiding engagement during the working interval of the wringer and to assure the freedom of the block for movement in the stile under all conditions. Features and details of the invention will appear from the specification and claims.

Preferred embodiments of the invention are illustrated in the accompanying drawing as follows:

Fig. 1 shows a portion of a wringer in central longitudinal section.

Fig. 2 a section on the line 2—2 in Fig. 1 with the block located as with pressure conditions.

Fig. 3 a similar view but with the block in release position.

Fig. 4 a side view of a movable bearing block, the roll shaft being in place and shown in section and the end of the spring in place on the block, the parts being in position assumed when the bearing is under pressure, with the stile removed.

Fig. 5 a side elevation of the block with the shaft shown in section, the block being in the position assumed before pressure is applied.

Fig. 6 a section on the line 6—6 in Fig. 1 with the block in position assumed before pressure is applied.

Fig. 7 a perspective view of the block shown in Fig. 6.

Fig. 8 is a central longitudinal section of a modification.

Fig. 9 a section on the line 9—9 in Fig. 8.

Fig. 10 a similar section but from the opposite direction of that in Fig. 9.

Fig. 11 shows a plan view of the bottom block.

Fig. 12 a cross section of an enlarged stile showing a further modification.

Fig. 13 a section on the line 13—13 in Fig. 12.

1 marks the base of the wringer, 2 a stile, the stile being of box shape in cross section and formed of sheet metal with the usual shaft receiving groove on the inner face, it being understood there is a similar stile at the opposite side of the wringer, and 2a the top of the wringer. Wringer rolls 3 and 4 are provided with shafts 5 and 6, these shafts extending into the stile. A lower bearing block 7 is arranged at the bottom of the stile and rests on a flat seat 8 formed in the base 1. The bearing block 9 for the upper roll shaft is slidingly mounted in the stile and a spring 10 forming the pressure means of the wringer rests on the upper engaging surface of the block, the spring forming the pressure means of the wringer.

A resetting lever 11 is pivotally mounted at 12 in the top bar. A link 13 is connected by a pin 14 with the lever 11 and by a pin 15 with the bracket 16 on the side stile. This structure forms a toggle resetting mechanism for resetting pressure on the wringer. The parts so far as described with the exception of the bearing blocks are or may be of usual construction.

The bearing blocks are provided with bearing grooves 17. In the upper blocks these grooves are formed in the perforations extending entirely through the blocks. The bearing groove is inclined with relation to the side faces 18 of the block. This swings the surfaces 19 into engagement with the inner walls of the stile when pressure is placed on the upper shaft and bearing groove 17, this pressure pressing the shaft against the surfaces of the side walls of the groove as inclined, camming the block so as to bring the groove toward alignment with the shaft. When the shaft and groove are in alignment the surfaces 19 in Fig. 2 are forced into guiding engagement with the walls of the stile.

The groove 17 is also inclined to the inner and outer faces of the block so that when the groove is brought to alignment with the shaft the block is swung to the position shown in Fig. 2, bringing the surfaces 20 into engagement with the walls of the stile. Thus there is a definite and close guiding engagement of the block with the walls of the stile when the wringer is in working condition or under pressure. On the other hand, there can be no sticking of the block by reason of swelling if the block is made of wood. When, however, the pressure is released the block is free to swing clear of binding engagements with the walls and may reach the position as shown in Fig. 3. There should be guiding engagement under pressure and looseness when pressure is released.

In order to definitely place the lower block in the right position and still have it readily slide to place the block may have features similar to that of the movable block. In this structure the block 21 has the groove 22 the axis of which is out of parallel with the sides 23 so that when the sides of the shaft operate on the side walls of the groove, it tends to swing the groove into alignment with the shaft and this tends to swing the block so that under pressure the surfaces 24 are brought into guiding engagement with the walls of the stile. The axis of the groove is also inclined to the faces 25 so that the faces 25a are pressed into guiding engagement with the walls of the stile as the pressure is delivered.

In the modification, Figs. 8 to 11, the wringer parts in the structure of Fig. 8 are similar to those of Fig. 1. The movable block 26 has a groove 27. This groove is inclined to the end faces 28 of the block, and the front and rear faces 30 of the block are inclined to the end face 31 of the block, so that when pressure is delivered to the surface 31 this surface is brought to horizontal position by pressure and the surfaces 29 are forced into engagement with the walls of the stile and also the surfaces 32 are forced into engagement with the walls of the stile, thus maintaining guiding engagement but freeing the surfaces from binding pressure when pressure is released.

The bottom block 33 has a groove 34. This groove is parallel with the bottom face 38 of the block. The front and rear faces 35 and side faces 37 are inclined to the bottom face 38. The bottom face rests on a flat portion of the base of the wringer which is at right angles to the walls of the stile, parallel to the axis of the lower shaft and in alignment with the bottom face of the lower block when the lower block is under pressure. When pressure is released on the block, the portions 36 and 39 of the faces 35 and 37 are relieved of binding pressure with the walls of the stile. When, however, the block is subjected to pressure, the bottom 38 is forced to its seat on the flat bottom portion of the frame, thus pressing the portions 36 and 39 into guiding pressure engagement with the side walls of the stile.

In the alternative structure shown in Figs. 12 and 13, the stile 40 is enlarged having an inturned inner face with flanges 41 forming the shaft receiving groove. The bearing block 42 has a rib 43 operating in the shaft receiving slot against the flanges 41. This rib 43 is inclined as indicated in Fig. 13. The end face 44 of the block, however, is at right angles to the stile wall so that when engaged by the spring it tends to place the surface 44 in a horizontal position, thus inclining the rib 43 to a position to engage the flanges 41, thus forming a definite guiding engagement.

What I claim as new is:

1. In a wringer having a frame including a base, hollow stile and rolls, one of which is movable, said rolls having shafts extending into the stile, the combination with the stile and the movable roll of a movable bearing block for the shaft of the movable roll having a groove and pressure means operating on a face of the block, the engaging surfaces of the face, means, shaft of the movable roll and groove under pressure from the pressure means tilting side faces of the block into guiding engagement with the faces of the stile and permitting the loosening of the tilted side faces as pressure is released.

2. In a wringer having a frame including a base, a hollow stile and rolls, one of which is movable, the rolls having shafts extending into the stile, the combination with the stile and movable roll of a movable bearing block for the shaft of the movable roll, said block having a bearing groove, pressure means forcing the shaft of the movable roll and groove into engagement, said groove being inclined to two side faces of the block tilting said side faces into guiding engagement with the faces of the stile under pressure and permitting loosening of the side faces as pressure is released.

3. In a wringer having a frame including a base, a hollow stile and rolls, one of which is movable, the rolls having shafts extending into the stile, the combination with the stile and movable roll of a movable bearing block for the shaft of the movable roll, said block having a bearing groove, pressure means forcing the shaft of the movable roll and groove into engagement, said groove being inclined to four side faces of the block tilting said side faces into guiding engagement with the faces of the stile under pressure and permitting loosening of the side faces as pressure is released.

4. In a wringer having a frame including a base, hollow stile and a roll, the stile having a shaft slot and the roll a shaft extending into the slot, the combination with the stile and shaft of a bearing block having a rib engaging the surfaces of the shaft slot under pressure, an end surface of the block inclined to the rib, and a pressure means having a horizontal pressure exerting face acting on the end of the block, said pressure inclining the rib into guiding engagement under pressure and permitting the loosening of the rib with the release of pressure.

WALTER L. KAUFFMAN, II.